US007973425B2

(12) United States Patent
Chen

(10) Patent No.: US 7,973,425 B2
(45) Date of Patent: Jul. 5, 2011

(54) POWER STRIP DEVICE FOR POWERING A MASTER LOAD AND MULTIPLE SLAVE LOADS

(75) Inventor: Kuang-Che Chen, Taipei (TW)

(73) Assignee: Primax Electronics Ltd., Taipei (TW)

( * ) Notice: Subject to any disclaimer, the term of this patent is extended or adjusted under 35 U.S.C. 154(b) by 399 days.

(21) Appl. No.: 11/775,329

(22) Filed: Jul. 10, 2007

(65) Prior Publication Data

US 2008/0261453 A1 Oct. 23, 2008

(30) Foreign Application Priority Data

Apr. 20, 2007 (TW) ............................... 96113891 A

(51) Int. Cl.
*H02J 1/08* (2006.01)

(52) U.S. Cl. ................ 307/12; 307/38; 307/39; 307/40; 307/41; 307/125; 307/126; 307/130; 307/131

(58) Field of Classification Search ........................ None
See application file for complete search history.

(56) References Cited

U.S. PATENT DOCUMENTS 3,601,620 A * 8/1971 Gee ................................. 307/86
3,676,738 A * 7/1972 Scanlan .......................... 361/49
3,686,530 A * 8/1972 Bogut ............................. 361/57
3,753,072 A * 8/1973 Jurgens ......................... 320/163
4,174,064 A * 11/1979 Pratt, Jr. ........................ 236/1 B
4,289,121 A * 9/1981 Kupriyanovich ............... 600/27
4,469,199 A * 9/1984 Polis et al. .................... 187/388
5,539,352 A * 7/1996 DuPuy .......................... 327/514
5,619,076 A * 4/1997 Layden et al. .................. 307/48
5,637,931 A * 6/1997 Hsu .............................. 307/116
5,955,791 A * 9/1999 Irlander .......................... 307/38
6,056,808 A * 5/2000 Krause .............................. 96/24
6,501,195 B1 * 12/2002 Barton .......................... 307/125
2003/0103304 A1 * 6/2003 Rendic ............................ 361/90
2003/0179524 A1 * 9/2003 Chou .............................. 361/62
2004/0124958 A1 * 7/2004 Watts et al. ................... 336/178
2005/0270020 A1 * 12/2005 Peczalski et al. ............. 324/247
2006/0175903 A1 * 8/2006 Palmer et al. ................... 307/39
2007/0071251 A1 * 3/2007 MacDuff ......................... 381/81
2009/0091192 A1 * 4/2009 Robertson et al. ............ 307/125

* cited by examiner

*Primary Examiner* — Jared J Fureman
*Assistant Examiner* — Justen Fauth
(74) *Attorney, Agent, or Firm* — Kirton & McConkie; Evan R. Witt

(57) ABSTRACT

A power strip device includes a power plug, a master power outlet, multiple slave power outlets and a control circuit. The control circuit includes an inductor, a reed switch and a switching circuit. Under the control of the control circuit, the power strip device allows the slave power outlets to be automatically turned on or off simultaneous with the master power outlet being turned on or off.

6 Claims, 4 Drawing Sheets

POWER STRIP DEVICE FOR POWERING A MASTER LOAD AND MULTIPLE SLAVE LOADS

FIELD OF THE INVENTION

The present invention relates to a power strip device, and more particularly to a power strip device including a master outlet and multiple slave outlet.

BACKGROUND OF THE INVENTION

With increasing development of high technology industries, computers become essential electronic apparatuses in our daily lives. For example, computers are employed for work or amusement purposes. For a purpose of performing specialized functions, a computer system may also include one or more peripheral devices linked to the host computer. Examples of the peripheral devices include speakers, printers, monitors, scanners or other electronic load products. Usually, the power cords of the host computer and the various peripheral devices are plugged in a multi-outlet power strip device. Since multiple electronic load products are simultaneously plugged in the power outlets of the power strip device, overloading will be a safety problem with the multi-outlet power strip device.

Referring to FIG. 1, a schematic perspective view of a conventional power strip device is illustrated. The power strip device 1 has a manual power switch 10 for selectively enabling or disenabling the multiple power outlets to receive power or prevent electrical current from being delivered.

For complying with safety regulations of operating computers, when the computer is powered off, the user needs to manually switch the manual power switch 10 into an open state to interrupt the flow of the utility power source to the power strip device 1. Since the flow of the utility power source to the power strip device 1 is interrupted, the hazards resulting from sparking of electric wires are reduced and power consumption is avoided. On the other hand, if the computer users forget to switch the manual power switch 10 into the open state, many load products are still running to consume power and thus the life of these load products may be shortened. For solving these problems, some power strip devices have been developed to automatically cut off the electricity to the power outlets while powering off the host computer.

For example, such a power strip device is disclosed in Taiwanese Patent No. M304817, and the contents of which are hereby incorporated by reference. Referring to FIG. 2, a schematic circuit diagram of the power strip device disclosed in Taiwanese Patent No. M304817 is illustrated. The power strip device 2 of FIG. 2 principally includes a master power outlet 21, a slave power outlet 22, a serial control bus 23, a control circuit 24, an electrical switch 25, a surge protector 26 and an indicator light circuit 27. An example of the serial control bus 23 is a universal serial bus (USB), which includes two power lines (VCC, GND) and two data lines (D+, D−). Hereinafter, the operation principle of the power strip device will be illustrated as follows. When the serial control bus 23 is electrically connected to the computer (not shown), a data signal DS is transmitted to control chip U1 of the control circuit 24 through the data line D+. In response to the data signal DS, a control signal CS is outputted through the output terminal of the control chip U1 to control the changeover switch Q1. In response to the control signal CS, the changeover switch Q1 is switched to an ON state or an OFF state. In a case that the changeover switch Q1 is in the ON state, driving power is transmitted to the electrical switch 25 through the power line VCC of the serial control bus 23 and the control circuit 24, and thus the electromagnetic coil MS of the electrical switch 25 is magnetized. The magnetized electromagnetic coil MS allow the changeover point OC to switch to the ON position. Meanwhile, the utility power source may be conducted to the slave power outlet 22 through the surge protector 26, thereby enabling the slave power outlet 22 and allowing an electronic load product (not shown) to be plugged therein.

On the contrary, in a case that the changeover switch Q1 is in the OFF state, the control circuit 24 interrupt the flow of the driving power VCC to the electromagnetic coil MS of the electrical switch 25 to demagnetize the electromagnetic coil MS. The demagnetized electromagnetic coil MS allow the changeover point OC to switch to the OFF position. Meanwhile, the utility power source is shut off and no longer conducted to the slave power outlet 22 through the surge protector 26, thereby disenabling the slave power outlet 22 and preventing electrical current from being delivered to the electronic load product (not shown).

As previously described, the power strip device 2 has a function of automatically cutting off the electricity to the power outlets while powering off the host computer. That is, when the host computer is powered off and no electrical current is conducted through the master power outlet 21, the slave power outlet 22 is disenabled. As a consequence, the benefits of safety and power-saving are both achieved. Unfortunately, this power strip device 2 still has some drawbacks. For example, since the driving power VCC is necessary to magnetize the electromagnetic coil MS of the electrical switch 25, another power-saving problem occurs. That is, additional consumption of the driving power VCC compromises the power-saving effect of the power strip device 2.

Therefore, there is a need of providing an improved power strip device having an enhanced power-saving effect.

SUMMARY OF THE INVENTION

It is an object of the present invention to provide a power strip device for allowing the slave power outlets to be automatically turned on or off simultaneous with the master power outlet being turned on or off.

In accordance with an aspect of the present invention, there is provided a power strip device for delivering power to a master load product and multiple slave load products. The power strip device includes a power plug, a master power outlet, multiple slave power outlets and a control circuit. The power plug is coupled to a utility power source to receive power from the utility power source. The master power outlet is used for delivering power to the master load product. The slave power outlets are used for delivering power to the multiple slave load products, wherein the slave load products are peripheral devices of the master load product. The control circuit is electrically connected to the master power outlet and the multiple slave power outlets for controlling ON/OFF states of the master load product and the multiple slave load products. The control circuit includes an inductor, a reed switch and a switching circuit. When the master load product is booted, an induction current flowing through the inductor is greater than a threshold value, so that the reed switch is switched to an ON state to close the switching circuit and enable the multiple slave load products connected to the multiple slave power outlets. When the master load product is powered off, the induction current flowing through the inductor is less than the threshold value, so that the reed switch is switched to an OFF state to open the switching circuit and disenable the multiple slave load products connected to the multiple slave power outlets.

In an embodiment, the power strip device further includes a surge protector and a switching circuit control unit.

In an embodiment, the switching circuit includes a relay and two diodes.

Preferably, the master load product is a host computer.

Preferably, the multiple slave load products include printers, monitors, scanners or speakers.

In an embodiment, the multiple slave load products are connected with each other in parallel.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

For overcoming the above described drawbacks resulting from the prior art, the present invention provides an improved power strip device having an enhanced power-saving effect without additional consumption of the driving power.

Figure 1:
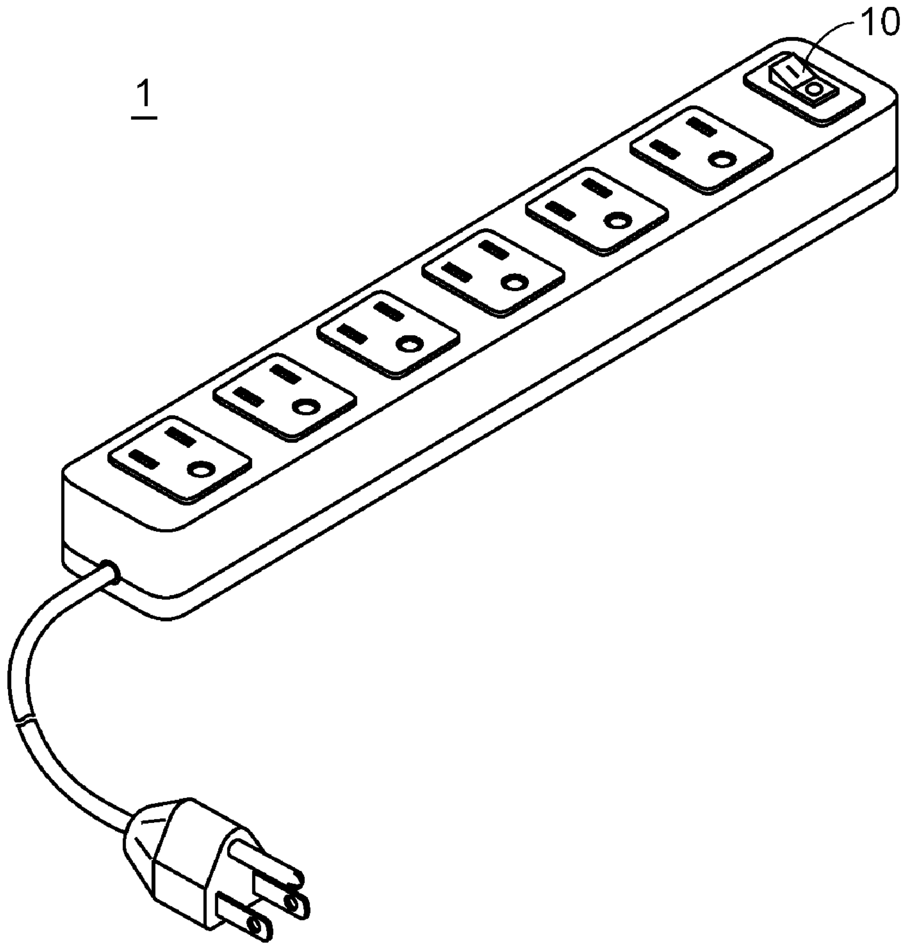
FIG.1 PRIOR ART
FIG. 1 is a schematic perspective view of a conventional power strip device.
Figure 2:
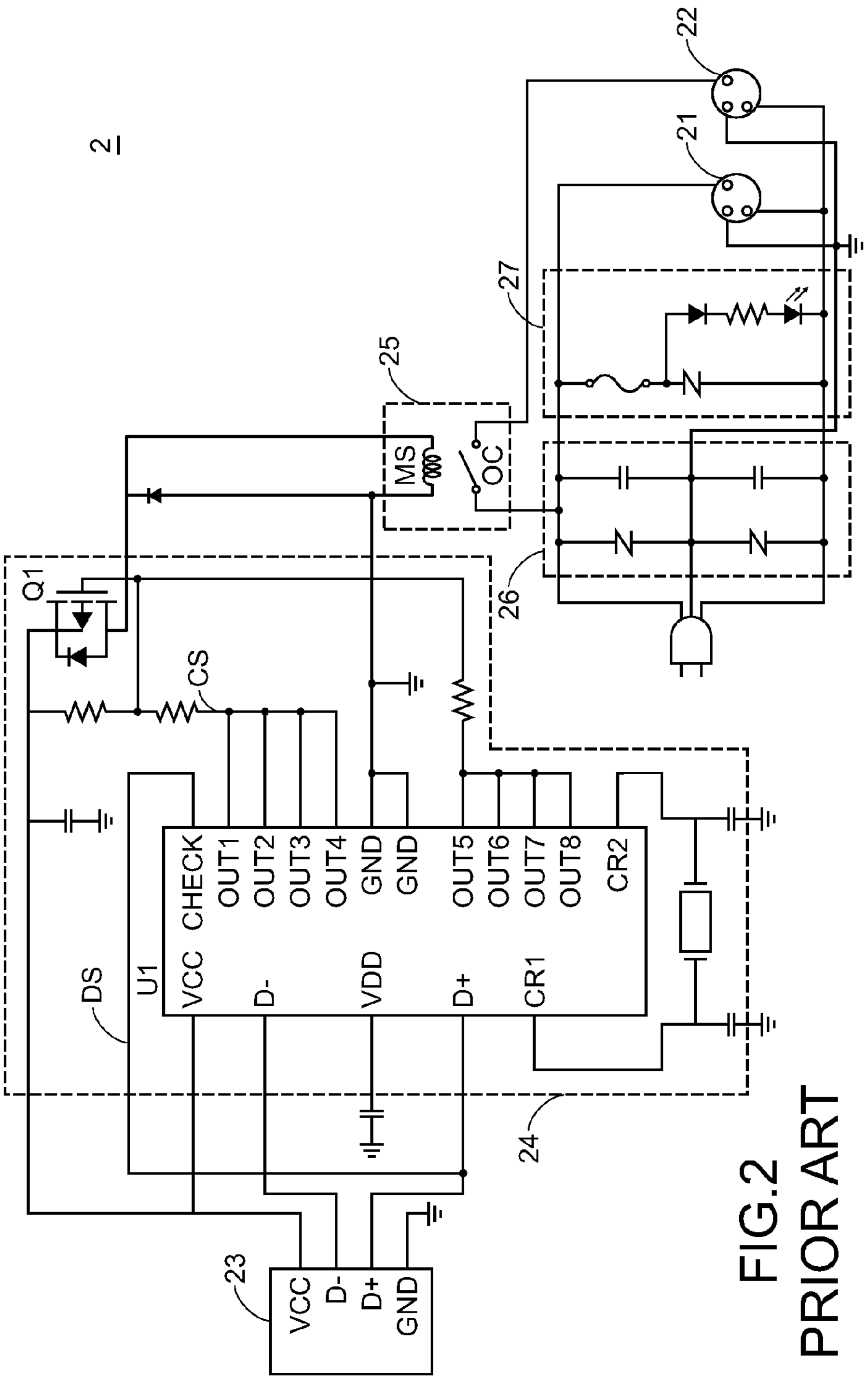
FIG.2 PRIOR ART
FIG. 2 is a schematic circuit diagram of another conventional power strip device.
Figure 3:
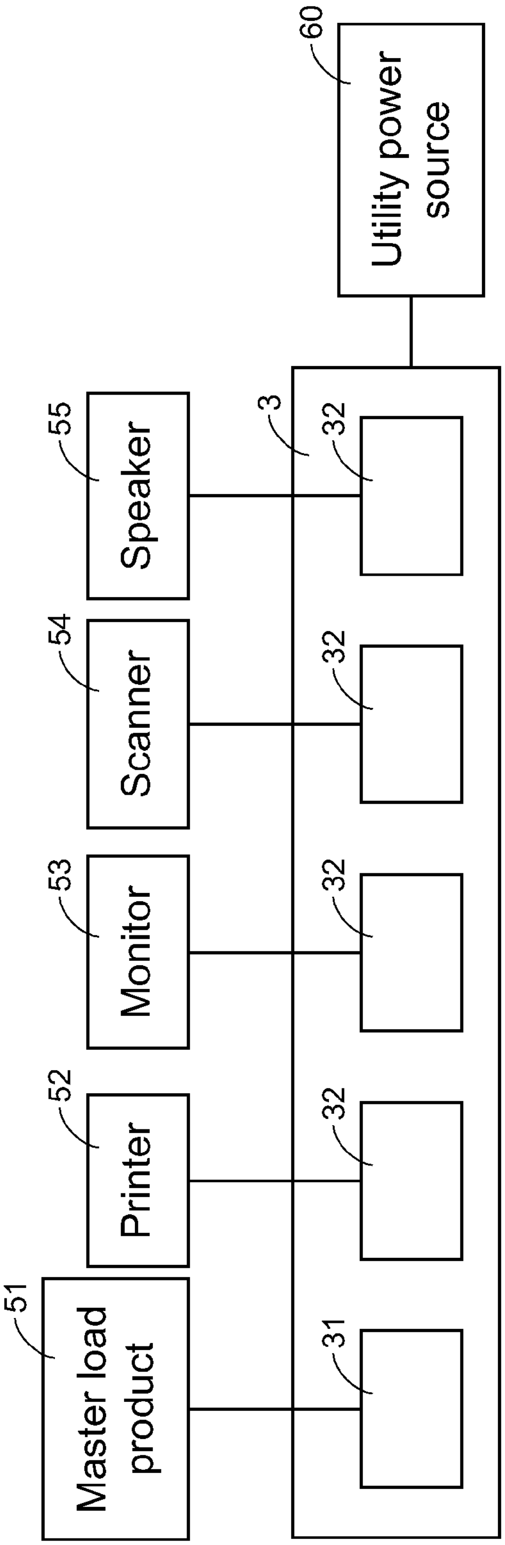
FIG. 3 is a schematic block diagram showing the connection between the power strip device and the load products according to the present invention.

FIG. 3 is a schematic block diagram showing the connection between the power strip device and the load products according to the present invention. As shown in FIG. 3, the power strip device 3 is electrically connected to utility power source 60, and includes a master power outlet 31 and multiple slave power outlets 32. The power strip device 3 is also electrically connected to a master load product 51 (e.g. a host computer) by plugging in the master power outlet 31. The power strip device 3 is also electrically connected to multiple slave load products by plugging in the slave power outlets 32. In this embodiment, the slave load products are computer peripheral devices including for example a printer 52, a monitor 53, a scanner 54 or a speaker 55.

Figure 4:
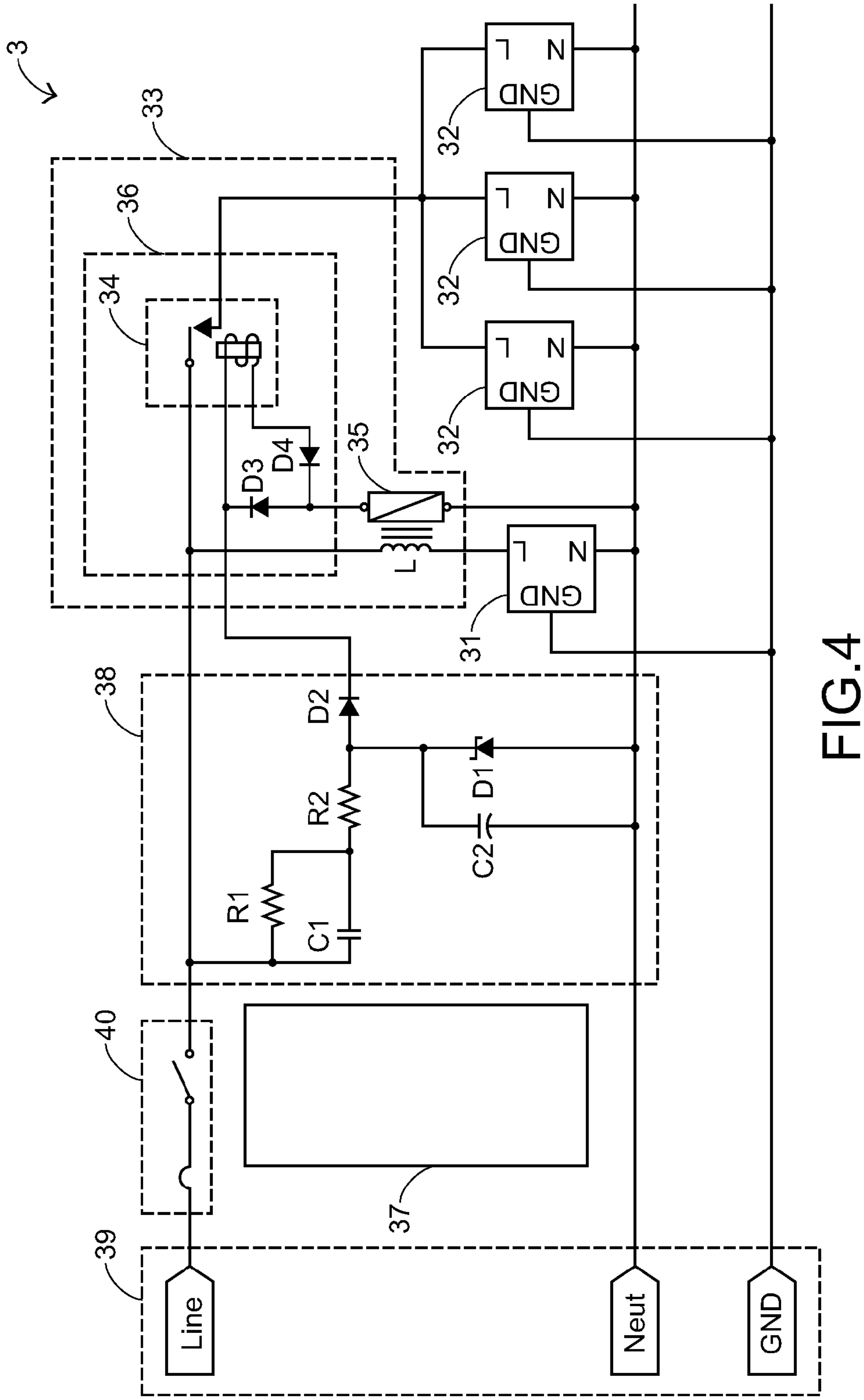
FIG. 4 is a schematic circuit diagram of the power strip device according to a preferred embodiment of the present invention.

Referring to FIG. 4, a schematic circuit diagram of the power strip device according to a preferred embodiment of the present invention is illustrated. The power strip device 3 principally includes a master power outlet 31, multiple slave power outlets 32, a control circuit 33, a surge protector 37, a switching circuit control unit 38 and a power plug 39. The control circuit 33 includes an inductor L, a reed switch 35 and a switching circuit 36. The switching circuit 36 includes a relay 34 and two diodes D3, D4.

The power plug 39 is coupled to a utility power source (not shown) to receive power from the utility power source to the power strip device 3. The power plug 39 includes a live wire (Line), a neutral wire (Neut) and a ground wire (GND). The neutral wires and the ground wires of the master power outlet 31 and the slave power outlets 32 are coupled to the neutral wire and the ground wire of the power plug 39, respectively. The live wire of the master power outlet 31 is coupled to the live wire of the power plug 39. Especially, the relay 34 is arranged between the live wires of the slave power outlets 32 and the power plug 39. By switching the relay 34 between an ON state and an OFF state, the slave power outlets 32 are selectively enabled or disenabled. In addition, the live wire of the power plug 39 is also coupled to a circuit breaker 40. In this embodiment, the circuit breaker 40 conforms to U.S. standard for protect an electrical circuit from damage caused by overload. The master power outlet 31 is electrically connected to a master load product, e.g. a host computer. The slave power outlets 32 are electrically connected to multiple slave load products including for example a printer, a monitor, a scanner or a speaker. The surge protector 37 is used to protect any load product connected to the power strip device 3. The principle of surge protection is known in the art, and is not redundantly herein. The switching circuit control unit 38 is arranged beside the surge protector 37 for controlling operations of the switching circuit 36. The switching circuit control unit 38 includes two diodes D1, D2, two capacitors C1, C2 and two resistors R1, R2. The resistor R1 and the capacitor C1 are connected with each other in parallel. The resistor R1 is connected to the parallel-connected resistor R2/capacitor C1 pair for stepping down voltage. The diode D1 is a Zener diode, which is used as a voltage stabilizer for delivering relatively constant output voltage. The capacitor C2 is a filtering capacitor. The diode D2 allows an electric current to flow in the forward direction, but blocks the electric current in the reverse direction. The relay 34 of the switching circuit 36 is an electrical switch that opens and closes under the control of the switching circuit control unit 38. The diode D3 offers a discharging path for the relay 34. Like the diode D2, the diode D4 allows an electric current to flow in the forward direction, but blocks the electric current in the reverse direction Moreover, the multiple slave power outlets are connected with each other in parallel. Before the host computer is booted, a tiny amount of current (also referred as a standby current) is still contained in the power strip device 3. The standby current is about 30 mA and insufficient to initiate the host computer and the computer peripheral devices. Once the power switch of the host computer is actuated to the boot the host computer, the master power outlet 31 is enabled and thus an induction current (not shown) flows through the inductor L of the control circuit 33. Since the induction current detected when the master power outlet 31 is enabled is greater than a threshold value (e.g. 80 mA~100 mA), the inductor L is magnetized by the induction current. Due to the electromagnetic effect of the magnetized inductor L, the reed switch 35 is switched to an ON state to close the relay 34 of the switching circuit 36. Under this circumstance, the paths connected to the slave power outlets 32 are conducted and the slave power outlets 32 are enabled to turn on the slave load products connected thereto.

Once the host computer is powered off, the flow of the utility power source to the master power outlet 31 is interrupted. Since the induction current detected when the host computer is powered off is smaller than the threshold value, the inductor L fails to be magnetized by the induction current. Due to demagnetization of the inductor L, the reed switch 35 is switched to an OFF state to open the relay 34 of the switching circuit 36. Under this circumstance, the electrical current is prevented from being delivered into the slave power outlets 32 and the slave power outlets 32 are disenabled to turn off the slave load products connected thereto.

From the above description, the power strip device of the present invention allows peripheral devices of the host computer to be automatically turned on or off simultaneous with the computer being turned on or off. Moreover, under the control of the inductor and the reed switch, the switching circuit is selectively conducted or shut off. Since no additional driving power is required to achieve the objects of the present invention, the power strip device has reduced power consumption when compared with prior art. In addition, since no power consumption of the reed switch is rendered when the host computer is powered off, the power strip device of the present invention has an enhanced power-saving effect.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A power strip device for delivering power to a master load product and multiple slave load products, said power strip device comprising:

- a power plug coupled to a utility power source to receive power from said utility power source;
- a master power outlet for delivering power to said master load product;
- multiple slave power outlets for delivering power to said multiple slave load products, wherein said slave load products are peripheral devices of said master load product; and
- a control circuit electrically connected to said master power outlet and said multiple slave power outlets for controlling ON/OFF states of said master load product and said multiple slave load products, said control circuit including an inductor, a reed switch and a switching circuit, said switching circuit comprising a relay switch to control power to said multiple slave power outlets, wherein an induction current flowing through said inductor is greater than a threshold value when said master load product is booted, such that said reed switch is switched to an ON state to provide power to said switching circuit and close said relay switch and enable said multiple slave load products connected to said multiple slave power outlets, and wherein said induction current flowing through said inductor is less than said threshold value when said master load product is powered off, such that said reed switch is switched to an OFF state to disconnect power to said switching circuit and open said relay switch and disenable said multiple slave load products connected to said multiple slave power outlets, such that there is no power consumption of the reed switch or switching circuit when the master load product is powered off.

2. The power strip device according to claim 1 further including a surge protector and a switching circuit control unit.

3. The power strip device according to claim 2 wherein said switching circuit further comprises two diodes.

4. The power strip device according to claim 1 wherein said master load product is a host computer.

5. The power strip device according to claim 4 wherein said multiple slave load products include printers, monitors, scanners or speakers.

6. The power strip device according to claim 1 wherein said multiple slave load products are connected with each other in parallel.

* * * * *